A. Reynolds.
Horse Hay Fork.

No. 76661. Patented Apr. 14, 1868.

Witnesses
Geo. Green
Wm. N. Coulson

Inventor
Andrew Reynolds
By Attorneys
J. B. Woodruff & Son

United States Patent Office.

ANDREW REYNOLDS, OF ROCK SPRINGS, MARYLAND.

Letters Patent No. 76,661, dated April 14, 1868.

IMPROVEMENT IN HORSE HAY-FORKS.

*The Schedule referred to in these Letters Patent and making part of the same.*

TO ALL WHOM IT MAY CONCERN:

Be it known that I, ANDREW REYNOLDS, of Rock Springs, county of Cecil, and State of Maryland, have invented a new and useful Improvement in "Horse Hay-Forks;" and I do hereby declare the following to be a full, clear, and exact description of the same, reference being had to the drawings accompanying this specification, and forming a part of the same, and to the letters and figures marked thereon, in which—

Figure 1:
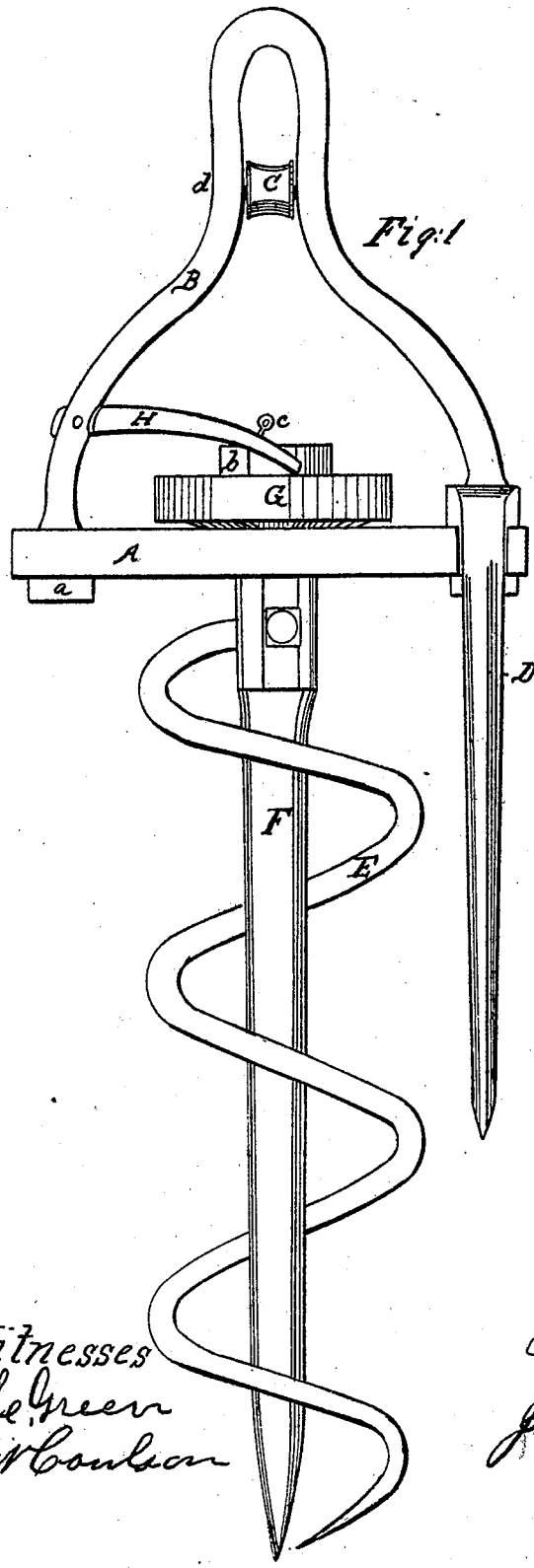

Figure 1 represents a front view of my improved "horse hay-fork," and

Figure 2:
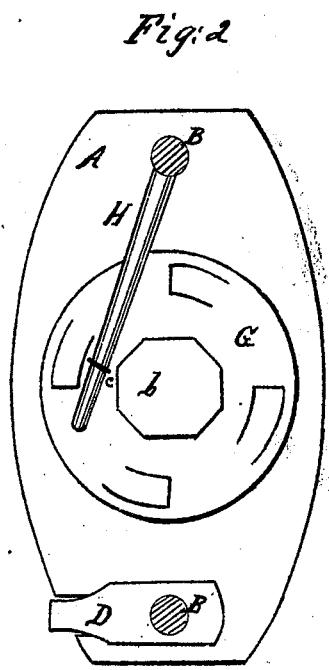

Figure 2 a plan view of the same, with the handle broken off to show the different parts.

My invention relates to an improvement in "horse hay-forks," by which simplicity of construction, lightness, and durability are attained, together with the saving of time and labor in its use. It is constructed of wrought iron or steel, as desired, has no cast parts to break, is very simple and easily made, and a great saving effected in the cost of the same.

In order that others may understand the nature, construction, and operation of my invention, I will proceed to particularly describe it.

A, fig. 1, is a plate of wrought iron, of proper size, to which the fork is attached. It has, at the ends, holes to receive the handle B, which is secured in its place on the under side of the plate by screw-nuts $a\ a$. This handle is made of an iron rod, bent as seen at fig. 1, and at $d$, near the top, the pulley or guide-wheel C is secured, its shaft passing through both parts of the handle, and turning therein. At one end of the plate A is attached the tine D, which projects downwards, as represented, and serves to keep the spiral tine E from turning out of the hay. In the centre of the plate A is a circular hole made, in which the upper end of the tine F is placed, and where it is free to turn. On the end which rises above the plate A is attached the circular plate G, and the two are firmly held together by a screw-nut, $b$. On the upper surface of this plate G (see fig. 2) are four notches cut, in which the pawl H catches to prevent the turning backwards of the tine F in the plate A. This pawl or latch H is secured at one end to the arm of the handle B, as shown at fig. 1, and has near its free end a hook, $c$, in which a cord is fastened, which, passing upward over the wheel C, extends downward within the reach of the operator. On the central tine F, at a point just below the plate A, I secure the spiral tine E, which curves around the tine F, and downwards to its end, by passing its end through a hole in the said central tine and fastening it by a screw-nut. To the top of the handle B, when the fork is to be used, I attach a rope to pass upward over an ordinary pulley, thence to communicate in any desired manner with the horse or other power to be used.

The operation of my invention is simple and easily understood. When it is wished to fasten the fork in the hay to be unloaded or removed, by raising the pawl H from the plate G, the spiral and other tines may easily be forced into the hay, and then, by dropping the pawl H and any power applied to raise the fork, the hay, caught and retained by it, will be raised, and when it is over the desired position, the pawl H is raised by the cord attached to it, and the fork instantly liberates itself from the hay, the spiral tine turning out and allowing the hay to fall.

Having thus described my invention, its construction and operation, what I claim, is—

A single spiral tine E secured to a central straight tine F, so that they both turn while the instrument is being forced into the hay and liberated from it, substantially as herein described.

ANDREW REYNOLDS.

Witnesses:
ELLIS J. TUCKER,
E. J. MOORE.